No. 827,018. PATENTED JULY 24, 1906.
A. M. HORNE.
CHEESE CUTTER.
APPLICATION FILED NOV. 23, 1905.

4 SHEETS—SHEET 1.

Witnesses
E. F. Stewart
H. S. Shepard

Arthur M. Horne
Inventor
by C. A. Snow & Co.
Attorneys

No. 827,018. PATENTED JULY 24, 1906.
A. M. HORNE.
CHEESE CUTTER.
APPLICATION FILED NOV. 23, 1905.
4 SHEETS—SHEET 2.
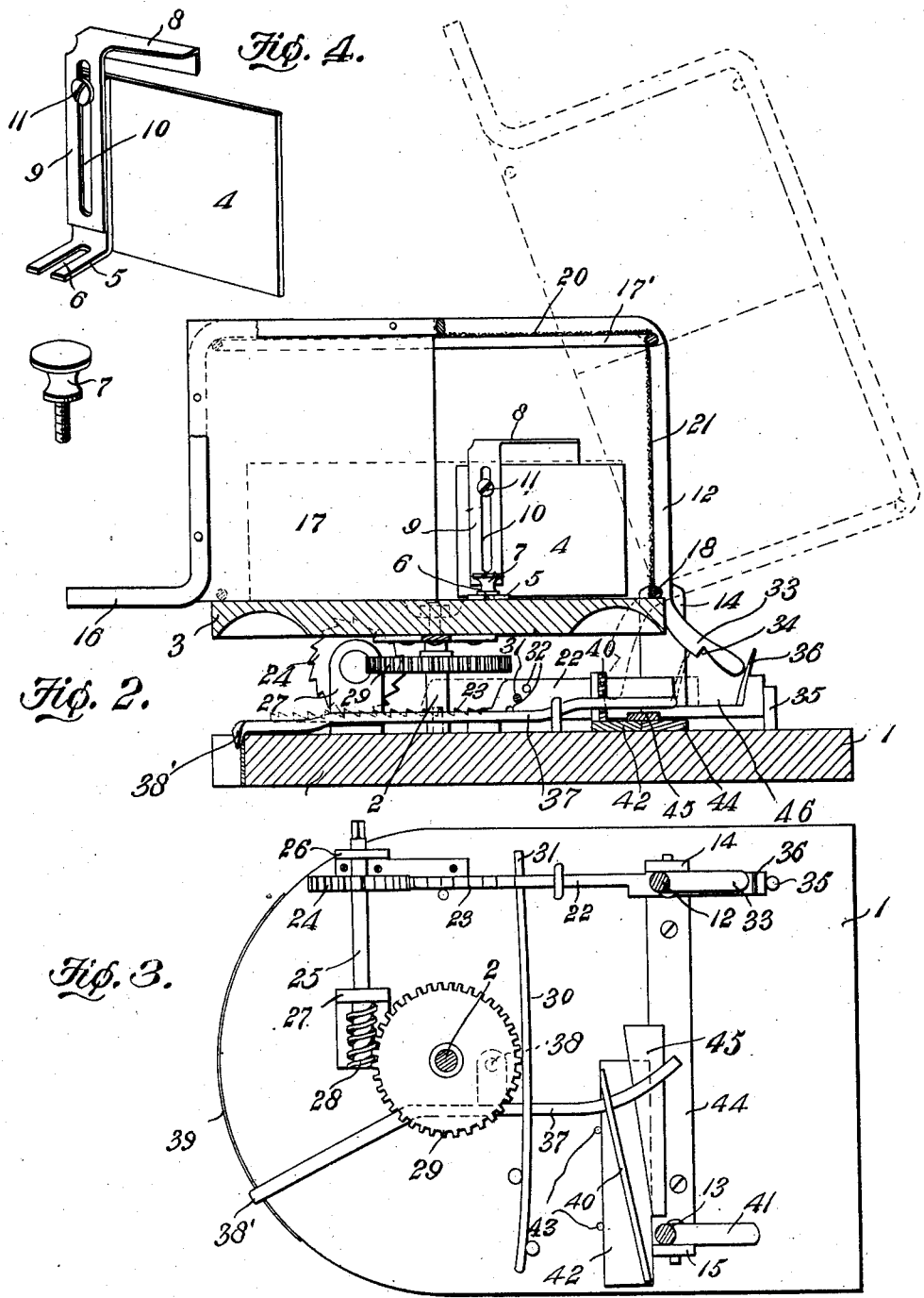
Witnesses
Arthur M. Horne, Inventor.
by C. A. Snow & Co.
Attorneys No. 827,018. PATENTED JULY 24, 1906.
A. M. HORNE.
CHEESE CUTTER.
APPLICATION FILED NOV. 23, 1905.

4 SHEETS—SHEET 3.

Witnesses
E. F. Stewart
H. F. Shepard

Arthur M. Horne, Inventor.
by C. A. Snow & Co
Attorneys

No. 827,018. PATENTED JULY 24, 1906.
A. M. HORNE.
CHEESE CUTTER.
APPLICATION FILED NOV. 23, 1905.
4 SHEETS—SHEET 4.
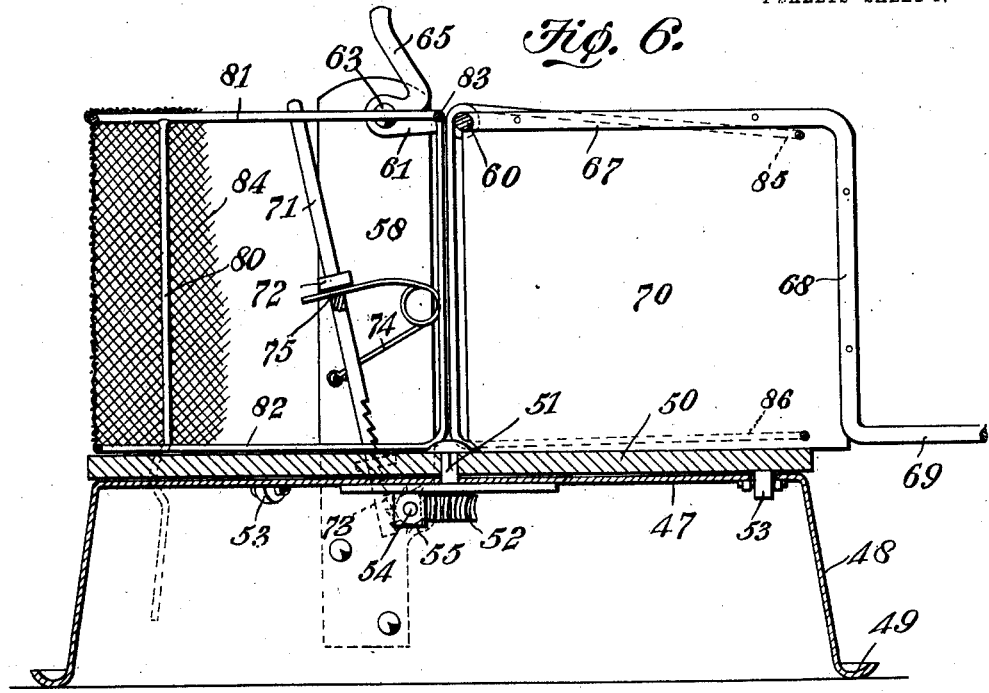
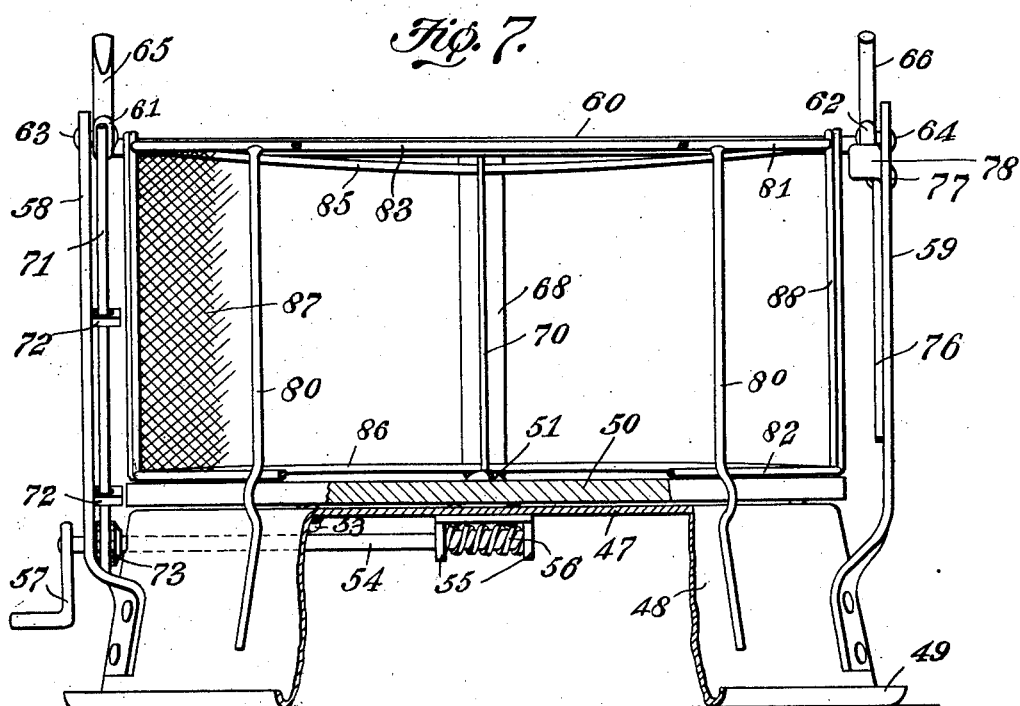
Witnesses
Arthur M. Horne, Inventor
by C. A. Snow & Co
Attorneys

UNITED STATES PATENT OFFICE.

ARTHUR M. HORNE, OF QUINCY, FLORIDA.

CHEESE-CUTTER.

No. 827,018.  Specification of Letters Patent.  Patented July 24, 1906.

Application filed November 23, 1905. Serial No. 288,754.

To all whom it may concern:

Be it known that I, ARTHUR M. HORNE, a citizen of the United States, residing at Quincy, in the county of Gadsden and State of Florida, have invented a new and useful Cheese-Cutter, of which the following is a specification.

This invention is a cheese-cutter, and has for its object to enable the convenient cutting or slicing of the cheese into slices of different predetermined weights and to have the cheesed housed and protected against flies and other insects, while at the same time effectually exposing the cheese for convenience in inspecting the same.

Other objects of the invention reside in providing for setting the cutting apparatus to cut slices of any predetermined weight, to enable the convenient manipulation of the cutter, to permit of the ready application and removal of a cheese, and to prevent displacement of the cheese by the cutting operation.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
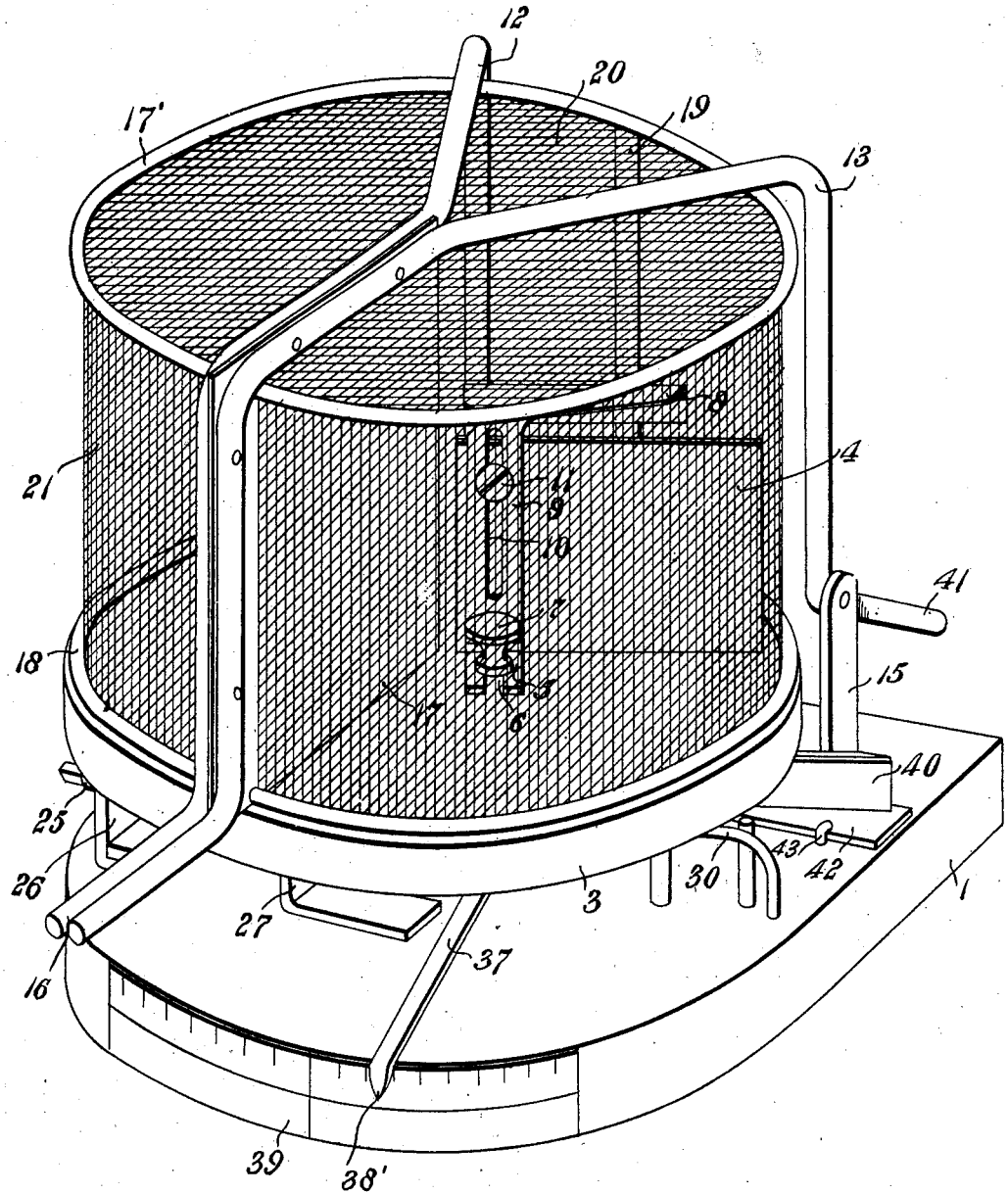
Figure 5:
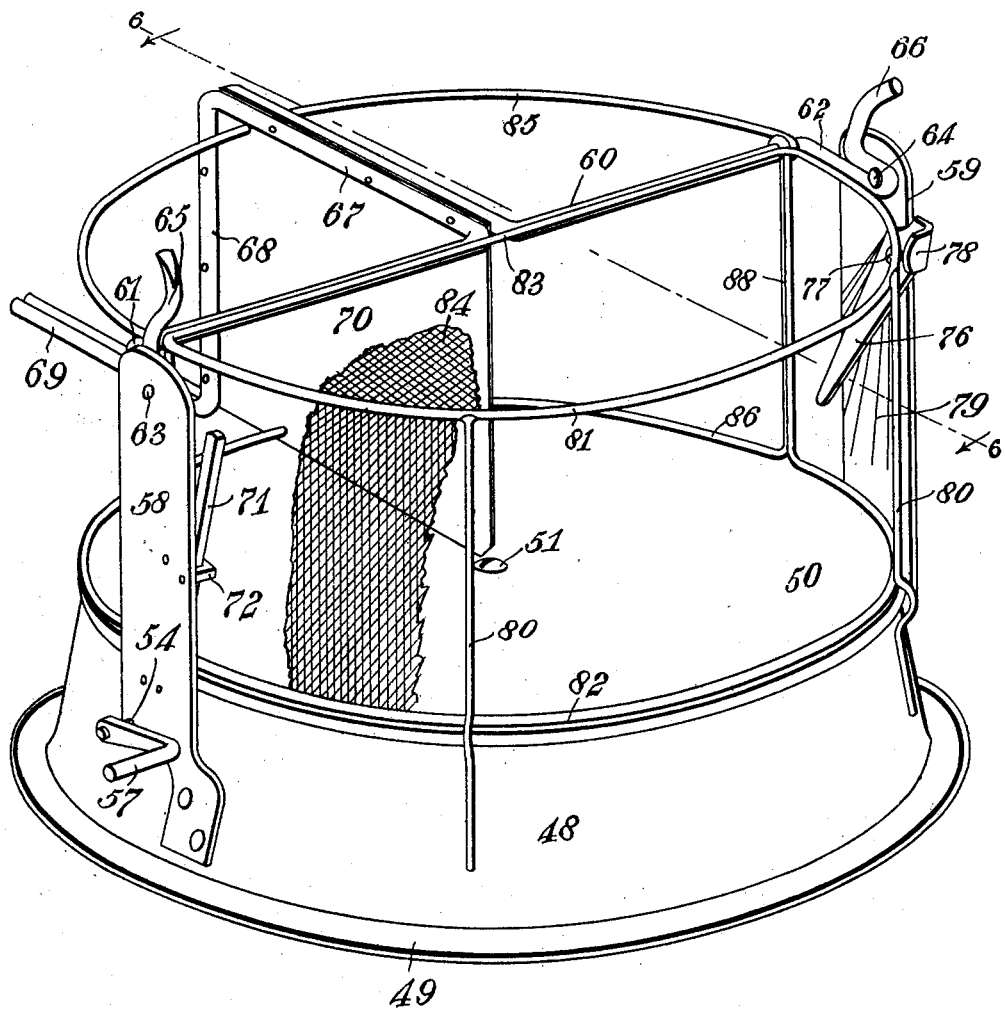

In the drawings, Figure 1 is a perspective view of a cheese-cutter embodying the features of the present invention. Fig. 2 is a vertical longitudinal sectional view thereof. Fig. 3 is a plan view with the rotatable platform removed. Fig. 4 is a detail perspective view of the cheese-clamp removed. Fig. 5 is a perspective view of another embodiment of the invention. Fig. 6 is a sectional view on the line 6 6 of Fig. 5. Fig. 7 is a rear view of the device with parts broken away to show the gearing for rotating the platform.

Like characters of reference designate corresponding parts in all of the figures of the drawings.

Referring at first more particularly to Figs. 1 to 4, inclusive, the present device includes a base or bed 1 of suitable size and of sufficient weight to prevent overturning of the apparatus when manipulating the same. From the top of this base there rises a post 2, upon the top of which a rotatable platform 3 is mounted and designed to support a cheese. For clamping a cheese upon the top of this platform after a portion of the cheese has been cut off there is provided a clamping device including a follower-plate or abutment 4, designed to set on edge upon the platform radially thereof and against one of the cut faces of the cheese. At the bottom of this plate there is a laterally-disposed flange or foot portion 5, provided with a slot or bifurcation 6, which is for the reception of a clamping-screw 7, set into a threaded opening in the top of the platform. The top edge of the plate or abutment 4 is overhung by an inverted substantially L-shaped clamp member 8, having a shank portion 9 lying against one face of the plate 4 and provided with a longitudinal slot 10 for the reception of a clamp-screw 11, carried by the plate, whereby the height of the clamp element 8 may be adjusted, and said element may be drawn down tightly against the top of a cheese and clamped thereon by the screw 11.

For cutting the cheese there is a lever, preferably made up of a pair of yoke-shaped or inverted-U-shaped metallic bars 12 and 13, which diverge rearwardly, as clearly shown in Fig. 1, and have their rear portions fulcrumed upon suitable brackets or posts 14 and 15, rising from the back of the base, while the other end portions of the bars are brought together and formed into a handle 16 for raising and lowering the lever upon its pivotal support. An upright knife-blade 17 is held between the top and front portions of the lever members 12 and 13 and disposed radially with respect to the platform, the lower edge of the blade being sharpened, so as to cut down through the top of the cheese when the lever is swung downwardly.

In order that the cheese may be housed and protected against flies and other insects, there is provided a casing or housing, including upper and lower metallic rings or bands 17' and 18, each piercing the cutting-blade 17, the upper band 17' being connected to the under sides of the diverged portions of the lever members and the two bands being connected by an upright brace-bar 19, thereby constituting a substantially cylindrical frame, which is covered across its top with wire fabric 20 and around its sides with wire fabric 21, thereby completing a cylindrical screen which is open at its bottom only so as to fit down over a cheese upon the platform, and thereby house the same, while giving an unrestricted view thereof.

It is proposed to provide for rotating the platform when the cutter is swung upwardly, in order that the cheese may be turned transversely beneath the knife-blade into position for a new cut, and this is carried out in the following manner: Beneath the platform and mounted upon the base so as to work in a direction front and rear thereof there is a slide 22, which has the forward portion of its upper edge toothed, as at 23, for engagement with a ratchet-wheel 24, mounted upon a transverse shaft 25, journaled in a pair of spaced bearings 26 and 27, provided upon the base. The inner end of this shaft is provided with a worm 28, disposed in mesh with a gear 29, mounted to rotate upon the post 2 and suitably connected to the platform 3, whereby the latter is rotated through manipulation of the slide 22. This slide is normally held at its rear limit by means of a spring-bar 30, disposed transversely across the base in rear of the post 2, with one end portion suitably secured to the base and its opposite free end 31 engaged with one of a series of perforations 32 in the slide 22.

For actuating the slide the rear extremity of the lever member 12 is inclined downwardly and rearwardly beyond the platform to form an arm 33, which is provided in the front side of its lower extremity with a notch or seat 34 to receive and bear against the rear end of the slide 22 when the lever has been elevated, as indicated by dotted lines in Fig. 2 of the drawings, whereby the slide is moved forwardly by the further movement of the lever after the arm 33 engages with the slide. When the lever is swung downwardly to cut a slice from the cheese, the spring 30 automatically returns the slide to its rear normal position, which is limited by a stop 35, rising from the platform. Rotation of the platform independently of the upward swinging of the lever is prevented by reason of the stop projection 36, rising from the rear portion of the slide and normally lying in engagement with the free extremity of the arm 33. To gage or set the apparatus for any predetermined amount of rotation of the platform, according to the size and amount in weight of the slice to be cut from the cheese, there is a gage device consisting of an index-arm 37, pivotally supported upon the base 1, as indicated at 38 in Fig. 3 of the drawings, the front end of the arm being bent or directed downwardly to produce a finger or pointer 39, embracing the rounded front edge of the base, which is struck upon an arc having its center located approximately at the pivotal point 38 of the index-arm 37. A suitable scale 39 is provided upon the end of the base, with which the pointer 38 is designed to coöperate. The curved rear end of the arm 37 loosely pierces an upstanding stop member or abutment 40, disposed obliquely across the forward path of movement of a stop-arm 41, carried by the rear end of the lever member 13 and projecting beyond the pivotal support thereof. This abutment is carried by a slide 42, working upon the top of the base between a pair of pins 43, which are driven into the base, and a cross-bar 44, which connects the posts 14 and 15 and is secured to the base. A flange 45 is provided upon the element 44, so as to overlap the slide 42 and prevent upward displacement thereof, thereby completing a guideway to direct the back-and-forth movements of the obliquely-disposed abutment 40. It will of course be understood that the opening in the abutment through which the arm 37 extends is of a size to permit of the necessary play of the arm in its swinging movements about the pivot 38.

In practice the foraminous hood or cover is elevated to the position shown by dotted lines in Fig. 2, whereupon a cheese is placed upon the platform 3 and the hood or cover returned to its normal position, as in Fig. 1, whereby the cheese will be housed and protected from flies and other insects and at the same time will be discernible through the cover. When it is desired to cut off a slice from the cheese, the index-arm 37 is set with respect to the scale 39 in accordance with the desired weight of cheese to be cut off, after which the lever is elevated by its handle 16 until the cutting-blade 17 clears the top of the cheese, whereupon the arm 33 of the lever member 12 engages the front wall of the seat 46 in the rear portion of the slide 22, and further rearward swinging of the lever forces the slide forwardly and rotates the platform 3 from left to right until stopped by reason of the arm 41 coming into contact with the abutment 40. The lever is then swung forwardly and downwardly, so as to force the cutting-blade downwardly through the cheese, and thereby cut a slice therefrom of a weight in accordance with the setting of the gage-arm 37. It will here be explained that the scale is arranged for a half-pound and fractions thereof, and to cut a pound from the cheese the gage-arm should be set to the one-half-pound mark and the lever swung upwardly and rearwardly, so as to rotate the platform and the manipulation of the lever then repeated without cutting a slice, so as to rotate the platform two one-half-pound distances, whereupon the cut is made and a one-pound slice severed from the cheese. Larger slices may of course be cut in accordance with the number of successive rotations of the platform in the manner just described.

When the original cheese is placed upon the platform, the cheese-holding follower and clamp is not employed; but when a quantity has been cut from the cheese the member 4 is placed against what will be termed the "rear face" of the cheese and the clamp applied in the manner shown in Fig. 2, so as to prevent tilting or upsetting of the cheese under the severing action of the knife-blade.

From the foregoing description it will be noted that the present device supports a cheese in a displayed condition and at the same time protects the same from flies and the like. Furthermore, the cheese is conveniently accessible for removal and may be cut by the simple up-and-down manipulation of the lever, provision being made for regulating the rotation of the cheese-supporting platform for gaging the amount in weight to be cut at each operation of the blade.

A very important feature of advantage resides in the fact that the mechanism for rotating the platform is located between the latter and the base, and is therefore housed against receiving accumulations of cuttings from the cheese, whereby the apparatus is maintained in a sanitary condition and requires little or no cleansing beyond what is necessary to cleanse the top of the platform.

As embodied in Figs. 5, 6, and 7 the invention includes an elevated base 47, supported by a depending annular rim or wall 48, which has its lower edge turned upwardly upon its outer side, as at 49, to form an annular channel for catching the cuttings from the cheese, whereby the counter or other support is protected from becoming greasy by accumulations of cheese cuttings thereon. Upon the top of the base is a rotatable platform 50, which is carried by a center post 51, rotatably piercing the top of the base and provided upon its lower end with a worm-wheel 52. At suitable intervals the outer portion of the platform is supported upon antifriction-rollers 53, which are carried by the base and project upwardly through openings therein into contact with the under side of the rotatable platform. A shaft 54 pierces the upright wall of the base and has its inner end portion mounted in spaced bearings 55, provided upon the under side of the base 47, there being a worm 56, carried by the shaft between the bearings 55 and engaging the worm-wheel 52. Upon the outer end of the shaft there is a crank-handle 57, whereby the platform may be quickly rotated to bring any portion of the cheese into an accessible position.

At approximately diametrically opposite points posts 58 and 59 rise from the sides of the base for the support of the cutting-blade and other portions of the apparatus. Extending between the upper portions of these posts is a bar 60, which is provided with terminal cranks 61 and 62, which are bent around stationary pivots 63 and 64, projecting inwardly from the top portions of the respective posts. It will here be noted that the bar 60 and the cranks 61 and 62 form a yoke, and the ends of the yoke are provided with the respective crank-arms 65 and 66, which normally incline upwardly and rearwardly. From the middle of the bar or yoke 60 there extends a lever 67, which is provided at its outer end with a depending portion 68, terminating at its lower end in an outwardly-directed handle 69. A cutting-blade 70 is carried by the lever portions 67 and 68 and is designed to be swung downwardly, so as to cut a cheese supported upon the platform 50. While the bar 60 and the lever 67 are shown as being formed by two rods, the bar 60 may be in a single piece and the lever in a single piece suitably connected to the bar.

To effect rotation of the platform by each manipulation of the knife-lever, a slidable rack-bar 71 is mounted in an upwardly-inclined disposition upon the inner side of the post 58 and works through guides 72, carried by the post. The lower toothed portion of this bar engages the ratchet-wheel 73 upon the shaft 54, and there is a spring 74, carried by the post, with its free end passing through the rack-bar, as at 75, with a tendency to hold the bar elevated. When the knife-lever is swung upwardly preparatory to making a cut, the arm 65 swings downwardly against the top of the rack-bar 71 and forces the same downwardly, thereby rotating the shaft 54 and in turn rotating the platform 50 to bring the cheese under the knife in position to be cut thereby when the knife is swung downwardly.

In order that predetermined weights of cheese may be accurately cut, there is a gage, consisting of an arm 76, pivotally supported at its upper end upon the inner face of the post 59, as indicated at 77. The top of this arm is provided with a shoulder 78 in the path of the crank-arm 66, whereby the elevation of the knife-lever is limited by contact of the arm 66 with the shoulder of the gage-arm. The inner face of the post 59 is provided with a scale 79, consisting of lines radiating from the pivotal support 77 of the gage-arm, and by swinging the gage-arm and having its front edge register with any one of these graduations or lines the upward swing of the knife-lever may be regulated so as to rotate the platform 50 for the required distance and enable the cutting of a predetermined weight in a single slice from the cheese.

In order that the cheese may be protected from flies and other insects, it is proposed to house the same, and this is carried out by means of a fixed housing consisting of posts or standards 80, rising from the back portion of the base and supporting upper and lower frame-bars 81 and 82, the ends of the upper frame-bar being connected by a cross-bar 83. A wire fabric 84 is applied to the top and outer side of this frame, so as to complete the stationary housing which incloses one half of the cheese. For inclosing the other half of the cheese there is a housing carried by the knife-lever and consisting of upper and lower bars 85 and 86, piercing the knife-blade and carrying a covering of wire fabric 87. The ends of the upper bar 85 are connected to the cross-bar 60, and the ends of the bar 86 are connected to the arm 60 by means of upstanding bars or standards 88.

In using the form of the invention shown in Figs. 5 to 7, inclusive, the gage-arm 76 is set to one of the graduations of the scale 79, according to the weight of cheese desired, whereupon the knife-lever is swung upwardly and the crank-arm 65 engages the push-bar 71, and thereby rotates the platform 50 until the stop-arm 66 engages the shoulder 78 of the gage-arm. During this upward movement of the knife-lever the platform is rotated to move the cheese past the knife just far enough to have the required weight sliced from the cheese when the knife-lever is swung downwardly. Any weight beyond the capacity of the scale 79 may be cut from the cheese by successively operating the knife-lever to rotate the platform without cutting the cheese until the platform has been rotated as far as desired. In connection with the setting of the gage-arm it will be noted that the shoulder 78 not only constitutes a stop for engagement by the arm 66, but provides a finger-piece or handle for convenience in setting the gage-arm.

It is of course apparent that the cheese-clamp illustrated in Figs. 1, 2, and 4 may be employed in connection with the form of the device shown in Figs. 5, 6, and 7 without requiring any alteration therein.

Having thus described the invention, what is claimed is—

1. A cheese-cutter comprising a base, a movable platform thereon, a cutter operating in conjunction with the platform, means to move the platform by the movement of the cutter, and adjustable means for limiting the angular movement of the platform.

2. A cheese-cutter comprising a base, a movable platform thereon, a lever fulcrumed upon the base, a knife-blade carried by the lever in coöperative relation with the platform, gearing for moving the platform, and a slide coöperating with the gearing and controlled by the lever for moving the platform.

3. A cheese-cutter comprising a base, a platform rotatable thereon, a lever fulcrumed upon the base, a knife-blade carried by the lever, a slide controlled by the movement of the lever and provided with teeth, a ratchet-wheel engaging the teeth of the slide, and gearing between the ratchet-wheel and the platform for moving the latter by the lever.

4. A cheese-cutter comprising a base, a movable platform thereon, a lever fulcrumed upon the platform, means to move the platform by the movement of the lever, a knife carried by the lever, an adjustable means for limiting the angular movement of the platform at each operation and a cover carried by the lever to cover the platform.

5. A cheese-cutter comprising a base, a movable platform thereon, a lever, a cutting-blade carried by the lever, means controlled by the lever for moving the platform, and gage mechanism including an adjustable stop element for limiting the movement of the lever and thereby regulating the movement of the platform.

6. A cheese-cutter comprising a base, a movable platform thereon, a lever fulcrumed upon the base, a cutting-blade carried by the lever, means controlled by the movement of the lever for moving the platform, a scale, a pivotal gage member in coöperative relation with the scale, and a stop member movable with the gage member and working in the path of a portion of the lever to limit the movement thereof and regulate the movement of the platform.

7. A cheese-cutter having a platform, a plate to lie against a cheese and provided with a flange to rest upon the top of the platform, means to connect the flange and the platform, a slotted shank adjustable vertically upon the plate and having a clamp element overhanging the plate, and a clamping-screw carried by the plate and extending through the slot of the shank.

8. A cheese-cutter comprising a base, a rotatable platform thereon, arms rising from opposite sides of the base, a lever fulcrumed between the arms, a knife-blade carried by the lever, a shaft carried by the base, means to rotatably drive the platform from the shaft, a gear upon the shaft, a substantially vertically moving toothed slide mounted upon one of the arms and meshed with the gear. and a member actuated by the lever and associated with the slide for moving the same to rotate the shaft.

9. A cheese-cutter comprising a base, a rotatable platform mounted thereon, arms rising from opposite sides of the base, a lever fulcrumed between the arms, a knife-blade carried by the lever, a substantially vertically movable slide mounted upon one of the arms, means controlled by the slide for rotating the platform, a member carried by the lever and associated with the slide to actuate the same, a gage device including an adjustable stop element mounted upon the other arm, the lever having a portion for engagement with the stop to limit the movement of the lever.

10. A cheese-cutter comprising a base, a rotatable platform mounted thereon, arms rising from opposite sides of the base, a cross-bar journaled upon the arms and provided with projections adjacent the arms, a lever carried by the cross-bar, a knife-blade carried by the lever, an adjustable stop member carried by one of the arms in the path of the adjacent projection, a slide mounted upon the other arm in the path of the other projection, and means controlled by the slide for rotating the platform.

11. A cheese-cutter comprising a base, a rotatable platform, a swinging knife-blade associated with the platform, normally inactive means controlled by the swinging blade for rotating the platform, means for rotating the platform independently of the movement of the knife-blade.

12. A cheese-cutter comprising a base, a rotatable platform, a swinging knife-blade, a shaft coupled to the platform for rotating the same, a ratchet-wheel upon the shaft, a toothed slide associated with the ratchet-wheel, means controlled by the knife-blade for moving the wheel, and a crank-handle upon the shaft for rotating the platform independent of the swinging movement of the knife-blade.

In testimony that I claim the foregoing as my own I have hereto affixed my signature in the presence of two witnesses.

ARTHUR M. HORNE.

Witnesses:
   ANNIE SMITH,
   THOS. MITCHELL.